Oct. 22, 1929.                J. A. WRIGHT                1,733,042
                           REAR AXLE ASSEMBLY
                         Filed Dec. 8, 1927          2 Sheets-Sheet 1

INVENTOR:
JAMES A. WRIGHT.

By

ATTORNEY.

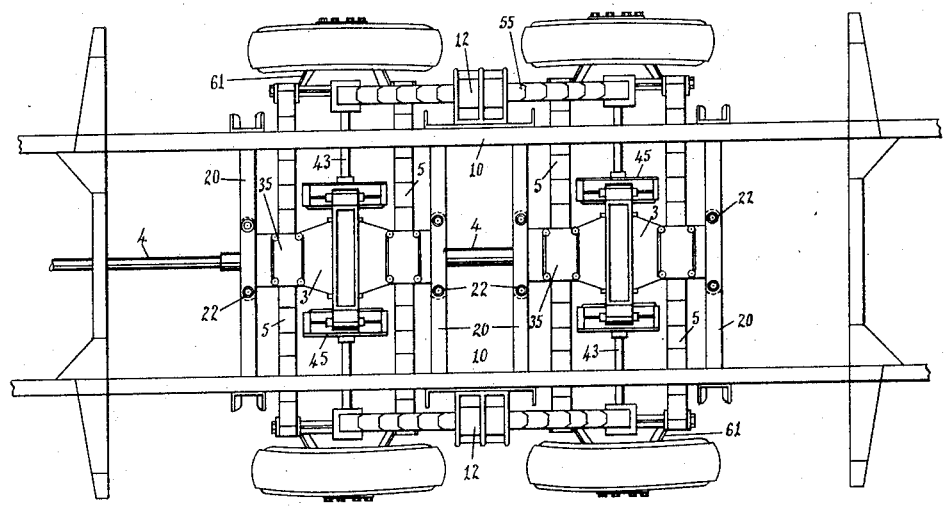
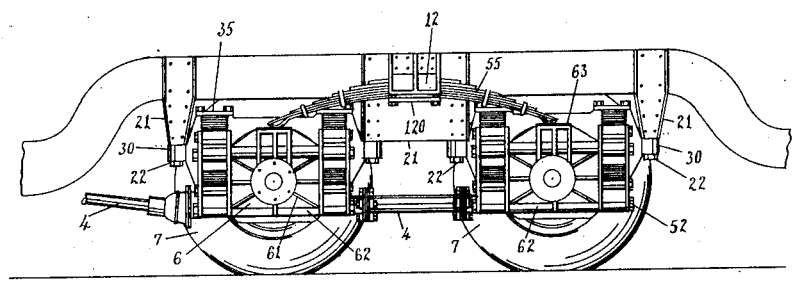
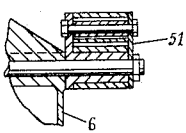 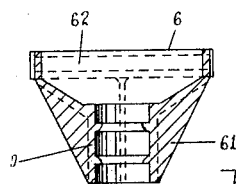

Patented Oct. 22, 1929

1,733,042

UNITED STATES PATENT OFFICE

JAMES A. WRIGHT, OF MONTREAL, QUEBEC, CANADA

REAR-AXLE ASSEMBLY

Application filed December 8, 1927. Serial No. 238,682.

This invention relates to motor vehicles having flexible axle suspension, and particularly to the rear axle assembly in such vehicles.

Its object is to provide an improved spring suspension with flexible axles in heavy vehicles of this type, including overload springs.

A further object is to provide an improved brake control and anchorage for such vehicles.

A further object is to provide an improved wheel carrier and wheel mounting thereon.

The invention consists in seating the transverse springs in seats in the differential casing which is secured at each end to cross members of the frame. The ends of the springs are coupled to shackles on bolts projecting from the sides of the wheel carriers.

Radius rods beneath the springs are pivoted to these bolts and to brackets projecting from the sides of the casing.

Overload springs parallel to the side members of the frame are seated in brackets projecting outwardly from the side members, with their ends bearing on seats on top of the wheel carriers.

The brake control and brake anchorage are mounted directly on the sides of the differential casing.

A wheel carrier having radiating ribs about the sleeve portion has horizontally parallel bores in its inner face, to secure bolts which are coupled to the radius rods and transverse springs. Above the upper bore it rises and projects inwardly to provide a flat top as a seat for the end of the overload spring.

Reference is made to the accompanying drawings in which:—

Fig. 4 is a plan view.

Fig. 5 is a side view with the inner wheels removed.

Fig. 6 is a vertical section of the spring shackles.

Fig. 7 is an axial horizontal cross section of the wheel carrier.

Figure 1:
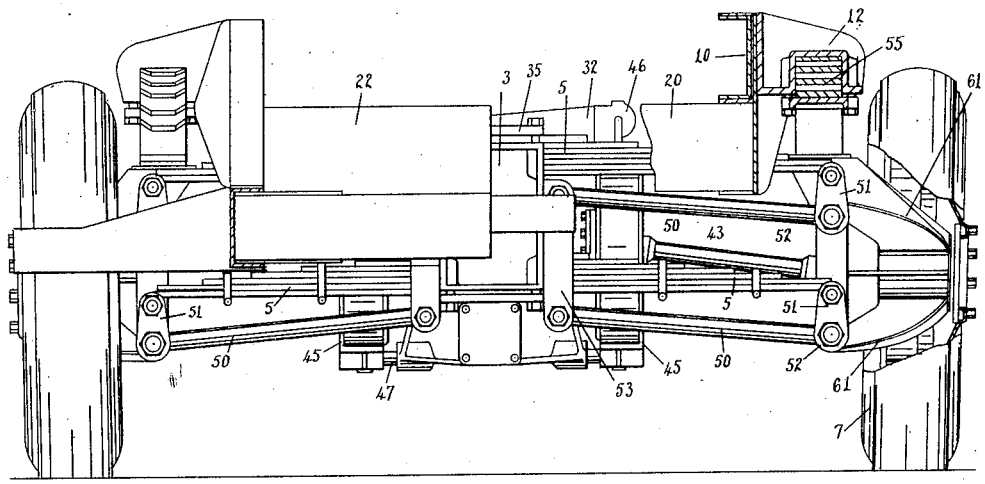
Fig. 1 is a right end view of Fig. 4 partly cut away.
Figures 2, 3:
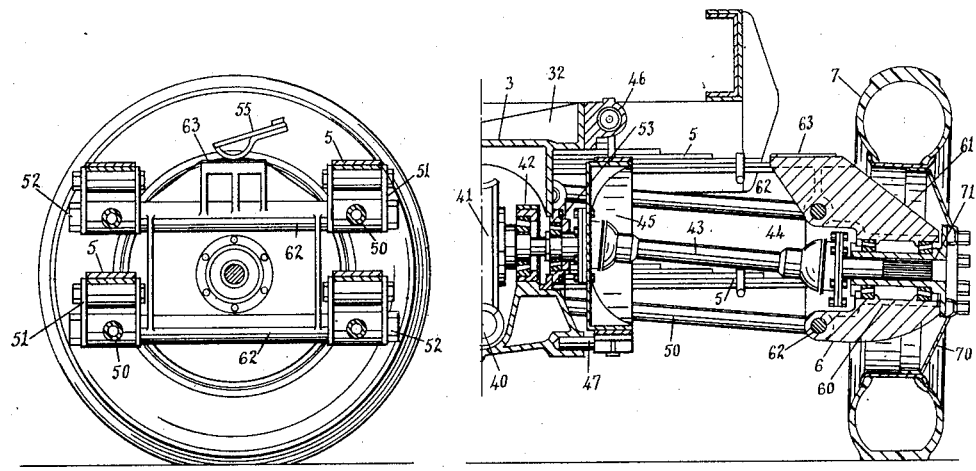
Fig. 2 is an inside view of the wheel carrier.
Fig. 3 is a vertical cross section through the axis of the wheel drive.

The side members 10, of the frame which are upwardly offset as shown in Fig. 5 have brackets 21, on their outer sides to which the cross members 20, are secured beneath the side members 10.

The differential casings 3, with their spring seats 31, and end brackets 30, are bolted centrally to the cross members 20, by the bolts 22.

The transverse springs 5, are secured at their seats 31, by anchor plates 35. Their ends are mounted on shackles journalled on the ends of the bolts projecting from the sides of the wheel carriers 6.

Radius rods 50, pivoted to brackets 53, projecting from the sides of the differential casing 3, extend below the transverse springs 5, and are journalled to the ends of the bolts between the shackles.

The wheel carriers comprise a sleeve 60, radiating ribs 61, extending inwardly to horizontally parallel bored portions 62, which form an enlarged recess, the upper portion having a vertical web and parallel ribs extending inwardly which support the spring seat 63.

Brackets 12, projecting outwardly from the side members 10, provide seats for the overload springs 55, which are secured therein by anchor plates 120, and extend parallel to the side members 10, and at their ends bear on the seats 63, of the wheel carriers.

The main drive shaft 4, is coupled to the worm 40, journalled in bearings at the bottom of the differential casing. The worm 40, meshes with the gear wheel 41, which drives the stub shaft 42, journalled in the side of the differential casing 3, and through the Cardan shaft 43, drives the stub shaft 44, splined in the stub axle sleeve 71, of the wheel hub 70, of the wheel 7.

This sleeve 71, is mounted on roller bearings in the sleeve 60, of the wheel carrier 6.

The brake drums 45, are mounted on the ends of the stub shafts 42. The brake band is anchored in the side of the differential casing 3 by the pin 47, entering the socket. The brake band control 46, is mounted on the bracket 32, extending from the top of the middle of the differential casing 3.

With a construction of this description the transverse springs are housed in a very rigid part of the frame, and the weight of the load is transferred from the center of the frame to the wheels through a balanced set of springs and wide wheel carriers of robust design.

By means of the set of parallel radius rods the wheel carriers are maintained parallel to the car body during vertical displacement of the wheels.

In addition to this spring suspension the overload springs on each side of the frame will transfer such overload directly to the two wheel carriers on which they bear. Normally these springs would bear but lightly on the wheel carriers.

These wheel carriers by their wide design and strong construction will transmit the load from the springs to the wheels without torsional or other unbalanced stresses.

What I claim is:—

1. In a rear axle assembly, transverse springs mounted in seats at each end, above and below a differential casing centrally secured by end brackets to cross members supported on side brackets, beneath the side members of the chassis frame, the ends of the springs being coupled by shackles to the wheel carriers on which the wheels are journalled, and overload springs secured to the side brackets adapted to bear on the wheel carriers.

2. In a rear axle assembly, transverse springs mounted in seats at each end, above and below a differential casing centrally secured by end brackets to cross members supported on brackets beneath the side members of the chassis frame, the ends of the springs being coupled by shackles to the wheel carriers on which the wheels are journalled, and overload springs seated in brackets projecting outwardly from the frame to which they are parallel, having their ends bearing on seats on the tops of the wheel carriers.

3. In a rear axle assembly with transverse spring suspension, a wheel carrier comprising a sleeve, radiating ribs thereto, a recessed portion having wide horizontally bored upper and lower edges and a central upwardly and inwardly projecting portion having a flat spring seat thereon.

4. In a rear axle assembly, a wheel carrier in which the wheel is journalled, having wide horizontally bored upper and lower edges with bolts therein, on each end of which the spring shackles and radius rods are pivotally mounted, and a central upwardly and inwardly projecting portion having a flat spring seat thereon.

JAMES A. WRIGHT.